Patented May 4, 1943

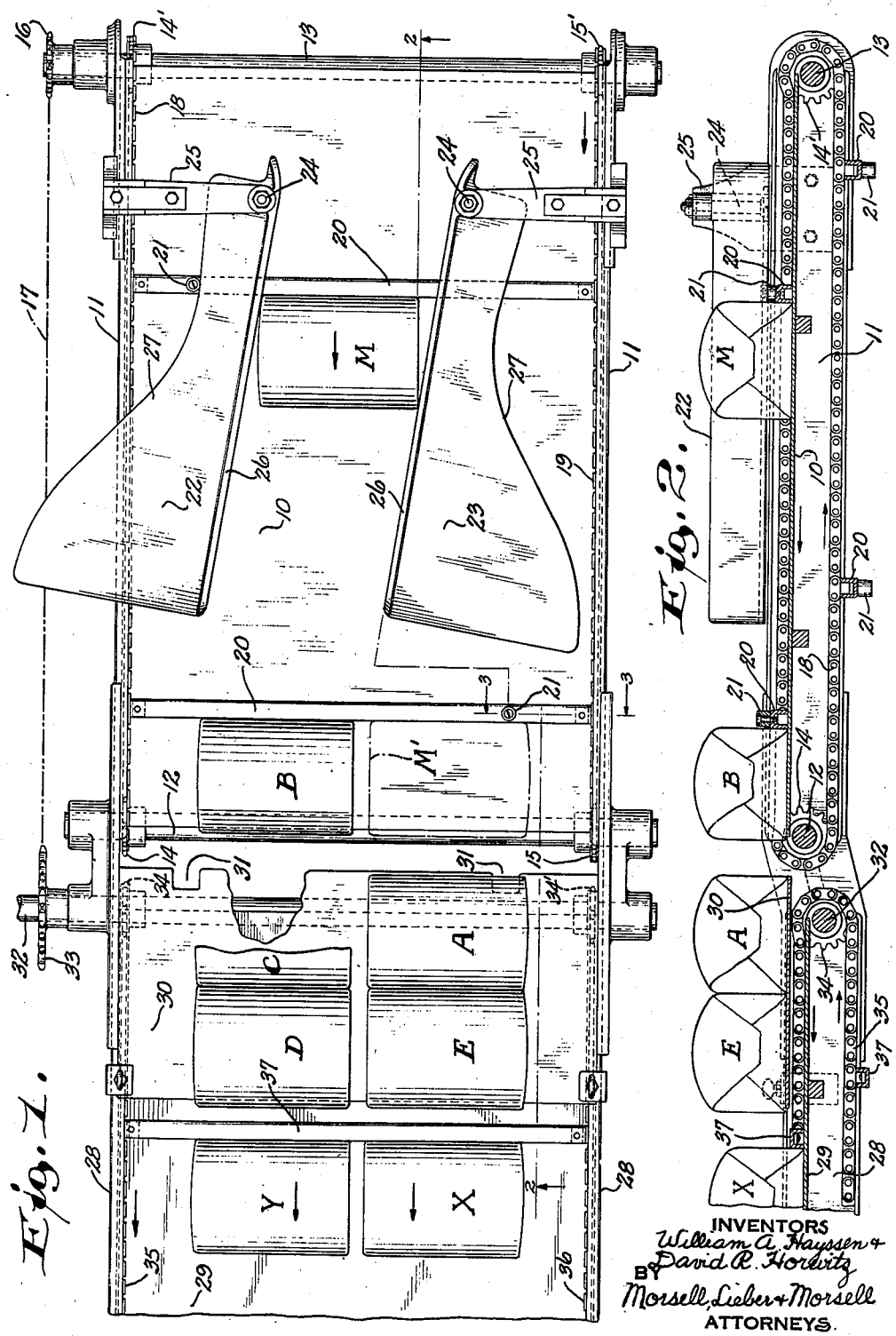

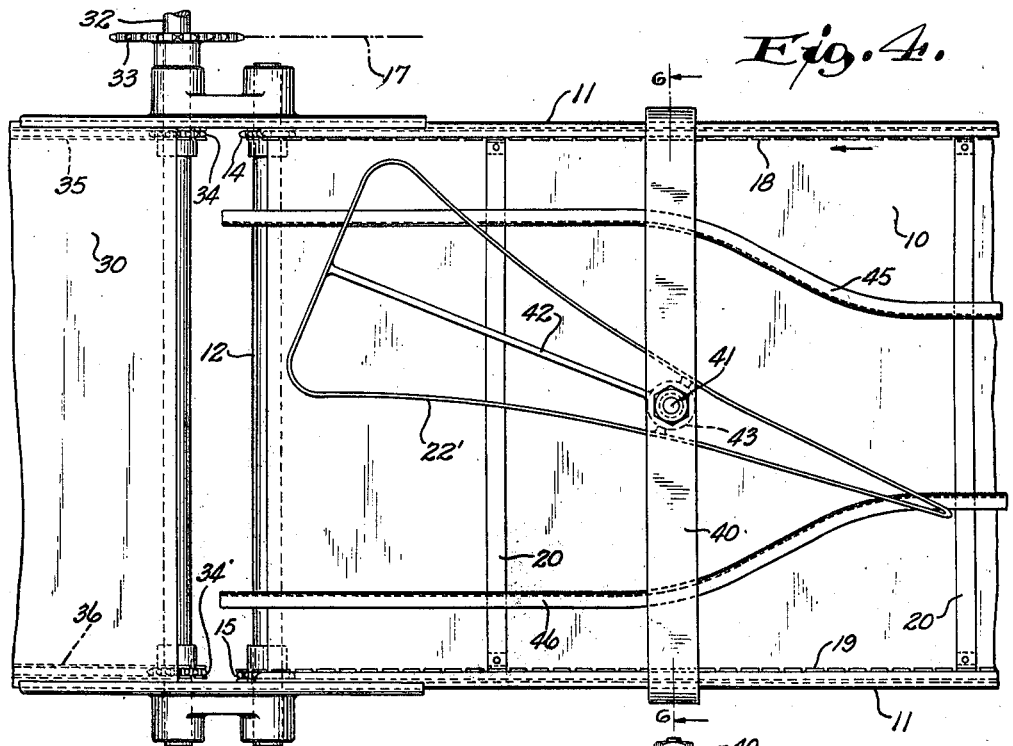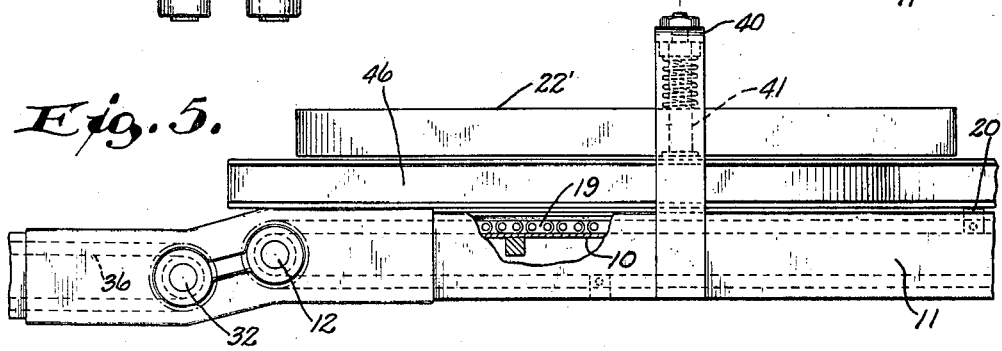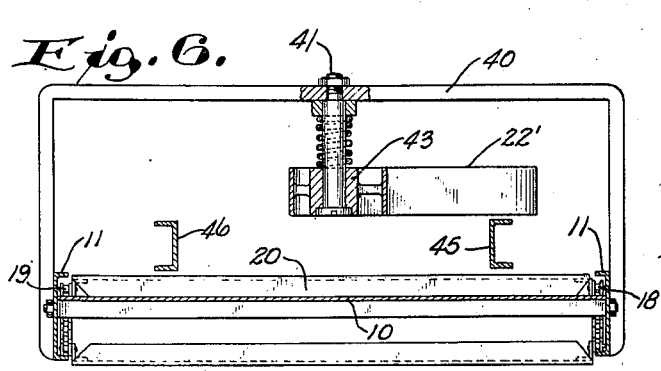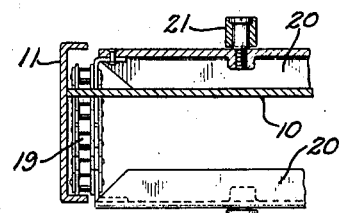

2,318,221

UNITED STATES PATENT OFFICE

2,318,221

FRACTIONAL WRAPPED LOAF ASSEMBLING AND ALIGNING DEVICE

William A. Hayssen and David R. Horwitz, Sheboygan, Wis., assignors to Hayssen Manufacturing Company, Sheboygan, Wis., a co-partnership consisting of William Hayssen, Jane P. Hayssen, and Marie Haysson Perry Application March 4, 1939, Serial No. 259,716

2 Claims. (Cl. 198—31)

This invention relates to improvements in fractional wrapped loaf assembling and aligning devices.

Since the introduction of sliced bread difficulties have been encountered relative to maintaining the bread in the package fresh after the package has been opened and prior to consumption of the entire loaf. To overcome this difficulty a practice has been introduced consisting of dividing the entire sliced loaf into smaller or fractional units, of which half a loaf is a convenient size, wrapping the fractional units separately, and then applying a second wrapper to the grouped fractional units, so that, for instance, a purchaser may secure a wrapped loaf of the conventional size, and upon removing the outer wrapper, separately wrapped fractional units are available for unwrapping and consumption, one at a time, whereby each unopened fractional unit will be kept air-tight and fresh until it is to be used.

In bakeries, loaves of bread are sliced and wrapped by automatic machinery wherein conveyors carry the loaves to and beyond the various mechanisms. In connection with the slicing, initial wrapping, and double wrapping of fractional loaves, it is contemplated that mechanism in the line will operate to slice each loaf in the usual manner, whereupon each sliced loaf is separated into fractional loaf units, each of which is separately wrapped and conveyed toward the final wrapping mechanism. Obviously, prior to the final wrapping, the requisite number of fractional units to constitute an entire loaf must be brought together in proper position and relationship to facilitate the automatic application of the final wrapper to each set of assembled fractional loaf units.

With the foregoing in mind, it is, therefore, the primary object of the present invention to provide a mechanism for interposition in the line of a bread or loaf handling machine, for automatically and expeditiously assembling and aligning fractional loaves so that successive groups of the prescribed number of fractional loaves are moved in the proper relationship to present each group of units to a final wrapping mechanism.

A further object of the invention is to provide a fractional wrapped loaf assembling and aligning device which groups and aligns successively advanced fractional loaves entirely automatically and mechanically, eliminating any manual operations or attention by an operator.

A further object of the invention is to provide a fractional wrapped loaf assembling and aligning device which may be readily incorporated in a bread slicing and wrapping machine without interfering with the other operations and functions of the machine.

A further object of the invention is to provide a fractional wrapped loaf assembling and aligning device which is of very simple construction, is inexpensive to manufacture and operate, is strong and durable, and is well adapted for the purposes described.

With the above and other objects in view the invention consists of the improved fractional wrapped loaf assembling and aligning device, and its parts and combinations, as set forth in the claims and all equivalents thereof.

In the accompanying drawings in which the same reference characters indicate the same parts in all of the views:

Figure 1 is a plan view of the improved fractional wrapped loaf assembling and aligning device associated with conveyors in a bread handling machine;

Figure 2 is a longitudinal vertical sectional view taken on line 2—2 of Figure 1;

Figure 3 is a fragmentary transverse vertical sectional view taken on line 3—3 of Figure 1;

Figure 4 is a fragmentary plan view of conveyor members of a bread handling machine showing a top view of a modified form of fractional wrapped loaf assembling and aligning device;

Figure 5 is a side view of the showing in Figure 4 with parts broken away and in section to show details of construction; and Figure 6 is a transverse vertical sectional view taken on line 6—6 of Figure 4.

While reference is made herein to the operation of the improved device on fractional loaves of bread, it is to be understood that the invention is not limited thereto and is intended to cover a device for aligning and assembling units or like articles or packages which are subsequently to be wrapped in grouped formations.

The appended drawings illustrate only those conveyor sections with which the improved device is directly associated. It should be understood, however, that in a line of bread handling mechanisms with which this invention is concerned successive whole loaves of bread are passed through a slicer. Thereafter each sliced loaf is divided into fractions or units (preferably half loaves) and a conveyor delivers the half loaves to a wrapping mechanism which applies a wrapper to and about each half loaf or unit. Another conveyor advances the separately wrapped fractions or units in single file to the device which constitutes the present invention, which device arranges or groups successive pairs of wrapped half loaves or units in position end to end and transversely of another conveyor, and said latter conveyor takes the aligned pairs of half loaves to another wrapping mechanism where a final wrapper is applied to each assembled pair or group of half loaves or units.

Referring now more particularly to the drawings, and with reference to the form of the invention disclosed in Figures 1, 2, and 3, it will be observed that an apron 10 is extended horizontally between a pair of spaced apart and suitably supported side rails 11. At both ends of the apron 10 and therebelow are revoluble shafts 12 and 13, having their respective ends suitably journaled in bearings. The shaft 12, adjacent the inner faces of the rails 11, carries sprocket wheels 14 and 15, and similar sprocket wheels 14' and 15' are similarly carried by the shaft 13. An end of the shaft 13 carries another sprocket wheel 16 engaged by an endless chain 17, which chain extends to a driving shaft, as will hereinafter appear, whereby the shaft 13 is driven to move conveyor chains 18 and 19 in the direction of the arrows in the drawings. The chain 18 extends about sprocket wheels 14 and 14', while the chain 19 extends about sprocket wheels 15 and 15'. Said conveyor chains 18 and 19 are adapted to propel transverse pusher bars or flights 20 whose end portions are secured to the chains 18 and 19, respectively, and which are arranged in a suitably spaced apart relationship. When on the upper extent of said chains 10 the pusher bars slide along the apron 10. Each pusher bar carries a cam roller 21 so positioned as to be above the bar when the latter is traveling along the top face of the apron 10. On adjacent pusher bars the cam rollers are in staggered relationship. For insatnce, the forward bar 20 in Figure 1 has its roller relatively close to one rail, while on the next pusher bar the roller is adjacent the other side rail.

Pivotally mounted above the apron 10 are a pair of fractional loaf deflectors or guides 22 and 23. Each of said deflectors has its inner end portion pivotally mounted on a stud 24 carried by an elevated bracket or arm 25. The respective arms for the deflectors 22 and 23 are secured to and project laterally inwardly from opposite rails 11 above the apron 10. The inner edge of each deflector carries a vertical, rectilineal wall portion 26, while the outer edge of each deflector is eccentrically curved to provide a cam surface 27, which cam surfaces are alternately engaged by the staggered rollers 21 of the pusher bars.

Aligned with the forward ends of the rails 11, but slightly below the horizontal plane of the same, are spaced side rails 28 supporting an apron 29 and forming another conveyor section. At the ends of said rails adjacent the apron 10 there is a horizontally disposed receiving plate 30 which is adjustably supported by the rails 28 over the inner end portion of the apron 29. The inner edge of said plate suitably spaced from the adjacent edge of the apron 10 to provide for flight clearance and recesses 31 in said plate end permit passage of the flight rollers 21. Suitably journaled in bearing brackets carried by the inner ends of the rails 28 is a transverse driving shaft 32. Said shaft receives its power from a source (not shown), and one end portion of said shaft carries a sprocket wheel 33 of twice the diameter of the sprocket wheel 16 on the shaft 13, whereby the shaft 13, through the chain 17, will be turned at twice the speed of the driving shaft 32.

Portions of the shaft 32, adjacent the inner faces of the rails 28, carry smaller sprocket wheels 34 and 34' engaged by endless conveyor chains 35 and 36. Said conveyor chains extend to the other end of said conveyor section and about other suitable sprocket wheels (not shown), being arranged relative to the rails 28 and apron 29, as best shown in Figure 2. The upper extents of said chains are below the plate 30 and above the apron 29. From the driving arrangement previously explained it will be apparent that said conveyor chains move in the direction of the arrows and at a rate of speed one-half that of the speed of travel of the conveyor chains 18 and 19. Pusher bars or transverse flights 37 have their opposite end portions secured to said chains 35 and 36 and the pusher bars are at suitable intervals, being arranged to move along the upper face of the apron 29.

When the entire line of bread machinery is in operation fractional wrapped loaves are delivered in succession onto the inner end of the apron 10 and centrally with respect thereto, the longest dimension of each loaf being transversely of said apron. The space between the inner ends of the deflectors 22 and 23 is sufficiently large to permit the entrance therebetween of a fractional loaf, said loaf having its rear edge engaged by a pusher bar 20, and being moved therealong by means of the same. As shown in Figure 1, the particular pusher bar which is moving the fractional loaf in question has its cam roller 21 adjacent the deflector 22. As the pusher bar moves forwardly the cam roller rides along the enlarged portion and outwardly curved edge 27 of said deflector, causing the deflector to swing toward the other edge of the conveyor and swings or pivots the deflector 23 a suitable distance in a counter clock-wise direction (with reference to Figure 1). As a result, when the fractional loaf reaches the end of the apron 10 it has been deflected from its original central position on the apron to a position laterally thereof behind and aligned with fractional loaf A. During the same period, however, an advance flight 20 has moved a preceding fractional loaf to position B, and pusher bar 37 at the inner end of apron 29 comes into position to engage and advance endwise aligned fractional loaves X and Y which had reached the illustrated position according to the succession of movements being explained. The pusher bars 37 move at one-half the speed of the pusher bars 20 so that when the said pusher bar 37 is sufficiently far advanced on the apron 29 to leave the inner end clear, due to timing and spacing as between the pusher bars, a substantial interval will elapse before another bar 37 comes into position at the inner end of the apron 29, whereby, during this period, fractional loaves deposited on to the inner end of the apron 29 will remain stationary. During this interval fractional loaf B, being advanced, pushes against previously deposited fractional loaves C and D, whereby fractional loaf D takes the position formerly occupied by loaf Y, loaf C replaces loaf D, and loaf B replaces loaf C.

By this time fractional loaf M has reached the position indicated at M' and another fractional loaf has been delivered onto the inner end of apron 10 which is taken by another pusher bar 20 through the deflectors 22 and 23. Due to the position of the cam roller 21 on this bar, however, the deflectors are swung so that the last mentioned loaf is delivered at position B. In this manner fractional loaves are alternately moved to positions B and M', the plate 30 is maintained with fractional loaves corresponding to those at C, D, A, and E, and fractional loaves are alternately advanced therefrom to positions X and Y in endwise alignment. The fractional loaves at said latter positions are not moved along until two have collected; so that the fractional loaves ultimately moved along the apron 29 are in endwise aligned pairs. Suitable end wings or guides (not shown and further along on the apron and conveyor) push the latter fractional loaves into endwise abutment and thereafter said aligned pairs of fractional loaves are delivered to a final wrapping mechanism (not shown) wherein each pair of fractional loaves has a final wrapping applied to form a unitary package containing two separately wrapped half loaves.

A modified form of fractional loaf assembling and aligning device is illustrated in Figures 4, 5, and 6. The supports, aprons, and conveyors are substantially similar to those described in connection with the principal form of the invention, but it should be observed that the pusher bars 20 do not carry cam rollers. A strap 40 transversely spans an intermediate portion of the apron 10. The ends of this strap are downturned and are rigidly secured to side portions of the rails 11. Depending from a central portion of the strap is a pivot post 41 on the lower portion of which is pivotally mounted a loaf deflector 22'. Said deflector is generally in the form of a triangle with flat vertical side wall portions and a central strut 42 terminating in a boss 43, intermediate the ends of the deflector, which boss receives the pivot post 41. Obviously the deflector 22' is suspended above the apron 10 free of the same and it is pivotally movable in a horizontal plane on the post 41. A coiled spring 44, surrounding a portion of the post and engaging the boss 43, imposes a desired frictional restraint on said deflector.

The deflector 22' is hung so that normally its reduced or tapered inner end portion is directed toward the inner end of the apron 10 midway between the side rails 11 and intermediate the constricted portions of a pair of spaced apart guide tracks 45 and 46. Said guide tracks have vertical inner face portions and are mounted immediately above the upper face of the apron 10, and extend longitudinally of the apron. Beyond the constricted portions of the tracks the same curve outwardly and then parallel the rails 11. Between said tracks there is an initial reduced path which flares into a substantially widened path.

The modified form of deflector operates in the following manner: Wrapped fractional loaves are delivered in succession onto the apron 10 into the path between the constricted portions of the tracks 45 and 46. A flight 20, moved into engagement with the rear edge of a fractional loaf, serves to advance said loaf. The tapered end of the deflector must originally be swung to one side or the other of the median line of the apron, and, assuming the deflector is in the position shown in Figure 4, the loaf being moved by the flight 20 will move between the inner longitudinal side of the deflector and the track 45. As the pusher bar advances the loaf, the loaf will be confined between said side of the deflector and the track 45, being ultimately deposited onto the corresponding side of the receiving plate 30. As the loaf advances along the deflector the latter pivotally turns to give it access and guiding. When the fractional loaf first handled is deposited on the plate 30 the deflector will have turned to a position opposite to that shown in Figure 4— that is to say, the pointed end of the deflector will be adjacent the track 45 and a pathway will be opened between said end portion of the deflector and the track 46, which pathway will be traversed by the next fractional loaf which is advanced into position. This next fractional loaf will of course be deposited on the receiving plate 30 in position adjacent the conveyor chain 36 and in endwise alignment with the previously deposited loaf. Thereafter the pairs of fractional loaves in endwise alignment are carried along by the conveyors 35 and 36 in the manner described in connection with the principal form of the invention. Due to the alternate swinging of the deflector from one angularly directed position to the other, successive fractional loaves are delivered onto opposite sides of the receiving plate 30.

From the foregoing description, it will be seen that the improved fractional loaf assembling and aligning device may be readily included in the line of a bread handling machine, operates efficiently and entirely automatically, does not require any attention from an operator or workman, and is well adapted for the purposes set forth.

What is claimed as the invention is:

1. In combination, a package conveyor whereon fractional packages are originally advanced in rectilineal order, said conveyor including spaced, movable flights, a pair of deflector members associated with a portion of the conveyor for shifting the successive advancing packages into staggered relationship on other portions of the conveyor, said deflectors being pivotally mounted relative to the conveyor and having a package receiving space therebetween in the line of travel of the rectilineally arranged packages, and means carried by flights of the conveyor for alternately swinging said deflectors upon the entrance therebetween of each successive package, first toward one side of the conveyor and then toward the other side of the conveyor.

2. In combination, a package conveyor whereon fractional packages are originally advanced in rectilineal order, said conveyor including spaced, movable flights, a pair of deflector members associated with a portion of the conveyor for shifting the successive advancing packages into staggered relationship on other portions of the conveyor, said deflectors being pivotally mounted relative to the conveyor and having a package receiving space therebetween in the line of travel of the rectilineally arranged packages, and cooperating eccentric means formed on the deflectors and on portions of the conveyor flights for alternately swinging said deflectors upon the passage therebetween of each successive package, in directions so that the discharge ends of said deflectors are alternately directed toward opposite side portions of the conveyor.

WILLIAM A. HAYSSEN.
DAVID R. HORWITZ.